United States Patent [19]

Holcombe, Jr.

[11] 3,965,063

[45] June 22, 1976

[54] HYDROPHILIC CONTACT LENSES AND LENS POLYMER

[75] Inventor: Frank O. Holcombe, Jr., Beltsville, Md.

[73] Assignee: Burton, Parsons and Company, Inc., Washington, D.C.

[22] Filed: June 30, 1975

[21] Appl. No.: 591,859

Related U.S. Application Data

[63] Continuation-in-part of Ser. No. 476,896, June 6, 1974, Pat. No. 3,926,892.

[52] U.S. Cl. .................... 260/29.6 TA; 260/63 UY; 264/1; 351/160
[51] Int. Cl.² ................. C08F 216/04; C08L 33/14
[58] Field of Search ............. 260/29.6 TA, 63 UY, 260/80.73; 264/1

[56] References Cited
UNITED STATES PATENTS

| | | | |
|---|---|---|---|
| 2,976,576 | 3/1961 | Wichterle | 18/58 |
| R27,401 | 6/1972 | Wichterle et al. | 260/2.5 R |

Primary Examiner—Stanford M. Levin
Attorney, Agent, or Firm—Fidelman, Wolffe & Waldron

[57] ABSTRACT

A superior hydrophilic gel polymer and contact lenses therefrom are formed by bulk polymerization of hydroxyethyl methacrylate, 1 to 20 weight percent N-(1,1-dimethyl-3-oxobutyl) acrylamide, or a mixture thereof with iso-butyl methacrylate, up to 5 weight percent cyclohexyl methacrylate, and about 0.01 to 0.50 weight percent trimethylolpropane trimethacrylate.

7 Claims, No Drawings

HYDROPHILIC CONTACT LENSES AND LENS POLYMER

This application is a Continuation-in-Part of applicant's copending application Ser. No. 476,896, filed June 6, 1974, U.S. Pat. No. 3,926,892.

This application relates to hydrophilic gel polymers and hydrophilic gel polymer lenses. More particularly, it relates to contact lenses of the so-called "soft" type. Still more particularly, it relates to hydrophilic gel polymer contact lenses having improved physical and mechanical properties. More particularly yet, the present invention relates to a novel hydrophilic gel polymer having exceptional physical and mechanical properties offering substantial advantages in the manufacture of contact lenses and to hydrophilic gel polymer contact lenses formed therefrom having superior physical and mechanical properties.

Hydrophilic gel polymers and contact lenses of such polymers are now well known in the art and are finding ever-wider use and acceptance. Such polymers and their employment are taught, for example, in U.S. Pat. 2,976,576 and in U.S. Reissue Pat. Re 27,401. The polymers therein disclosed and claimed are cross-linked, three-dimensional gel latices resulting from the addition polymerization of, normally, hydroxyethyl methacrylate and a minor amount of ethylene glycol dimethacrylate. The polymers thus formed are hydrophilic and are swelled by, but insoluble in, water. When fully hydrated, depending upon the degree of cross-linking, they contain 20 to 97 weight percent water and swell to an extent which is a variable of the water content. When hydrated, the polymer is soft, pliable, optically clear and, normally, colorless.

Because of the combination of properties of such hydrated gel polymers, they have been found useful in the manufacture of contact lenses and offer characteristics not before obtainable.

There have been, however, some difficulties presented by the hydrophilic gel polymer lenses. They are far more difficult to manufacture than the more conventional hard plastic lenses, usually made of poly(-methyl methacrylate). The gel polymers require formation in the lens blank form, usually by centrifugal casting of the bulk polymerization mix. As a consequence, production is slow and expensive in both time and equipment. In addition, the blank must be closely conformed to the ultimate lens shape in unhydrated form since the polymer is not easy to precisely machine to lens tolerances. In another aspect, it has been difficult to control the hydration characteristics of the polymer so that expansion is predictable and reproducible within the necessary close tolerances. In yet another context, it has provided impractical to obtain some lens shapes by the required techniques and, thus, some ocular debilities have not been susceptible to correction with gel lenses. An example, astigmatism, has not successfully been corrected with the gel lenses. Even at best, tolerances are difficult to maintain with the desired precision. Very often visual acuity is not as good as can readily be obtained with hard lenses. The gel lenses are also somewhat fragile, with a tendency to fray and a susceptibility to abrasion damage.

It is accordingly an object of the present invention to provide a novel hydrophilic gel polymer which is not subject to the foregoing disadvantages, which is easily and precisely machinable to close tolerances, which has predictable and reproducible degree of hydration, expansion upon swelling, and which can be formed into complex shapes with precision.

Another object is the provision of hydrophilic gel lenses from such polymers having physical and mechanical properties superior to prior gel lenses.

These and still other objects are attained, as will be clear from the present disclosure, by addition polymerizing in bulk a monomer mixture of a major proportion of hydroxyethyl methacrylate and minor proportions of the following co-monomers: cyclohexyl methacrylate, N-(1,1-dimethyl-3-oxobutyl)acrylamide, i-butyl methacrylate and, as a cross-linking monomer, trimethylolpropane trimethacrylate. The monomer mixture is addition polymerized in bulk, that is, in the absence of solvents or suspending or emulsifying media by techniques known per se and common in the art. Such techniques require no instruction to those of ordinary skill in the art and form no part of the present invention. As is familiar to those of ordinary skill, such polymerization may be effected with no catalyst or (more commonly) may employ any of the various known addition polymerization catalyst systems (such as, for example, free-radical catalysts, Redox catalyst, Friedel-Crafts catalysts, Ziegler-Natta catalysts and the like). Free-radical catalyst systems are generally preferred and particularly per-compounds, for example, peroxides. A preferred catalyst species for the polymerization of the present invention is 2,5-dimethylhexane-2,5-diperoxy-2-ethyl hexoate.

The addition polymer of the present invention is a tough, resilient solid in its dry, unhydrated state, readily machinable to substantially and desired shape with quite precise tolerances. When hydrated, full hydration results in the absorption of about 25 to 50, most often about 35, weight percent water, based on the weight of the polymer, and a linear expansion of about 14 to 30, most often about 18 percent greater than the dry material. The hydrated gel is fully clear and colorless and is a tough and resilient material, elastically (but not plastically) deformable. The gel is non-toxic and biologically and physiologically tolerable. By virtue of these characteristics, contact lenses of exceptional superior properties are formed with exceptional ease, without the attendant problems and disadvantages heretofore encountered.

Hydroxyethyl methacrylate is, of course, a well known and even familiar compound to those of ordinary skill. It is a freely available article of commerce. In the present disclosure, the hydroxyethyl methacrylate employed was the material sold as "Hema", by Rohm and Haas, and was employed after distillation of the commercial form as received. As noted above, the hydroxyethyl methacrylate will be the predominant monomer in the polymerization mix, on the order of about 80 to 90 weight percent.

A second monomer to be employed is N-(1,1-dimethyl-3-oxobutyl) acrylamide, frequently referred to and sold as diacetoneacrylamide. It has been found that this monomer substantially increases oxygen permeability of the hydrated gel matrix of the polymer, resulting in greatly prolonging the periods of wear tolerated by users of lenses. It will be employed in proportions of from about 1 to 20 weight percent of the monomer mix, more often about 5 to 15, and preferably about 10, weight percent.

An optional, but preferred co-monomer in the present invention is iso-butyl methacrylate, a well-known commercially available material. When employed in the present invention, it should be considered a partial replacement for the N-(1,1-dimethyl-3-oxobutyl) acrylamide, on an equal weight basis. When so employed, it is preferred that not more than about one-half the combined amounts be isobutyl methacrylate.

Another common, commercially available co-monomer optionally employed in the formation of the polymer of the present invention is cyclohexyl methacrylate, sold under the trademark "SR 208", by Sartomer Company. It too is employed after distillation from its commercially marketed form. The proportions of the cyclohexyl methacrylate employed will generally be in the range of from about 0 to 5 weight percent of the monomer mix, preferably about 4 weight percent, based on the hydroxyethyl methacrylate.

The cross-linking monomer of the polymer of the present invention is trimethylolpropane trimethacrylate. The commercially available material employed in the present disclosure is sold under the trademark "SR 350", by Sartomer Company and is filtered through activated carbon before use. The cross-linking monomer is included in the polymerization mix in proportions of about 0.01 to 0.50, preferably about 0.136, weight percent of the weight of hydroxyethyl methacrylate.

The foregoing monomers are mutually soluble in one another and form a homogenous solution which is readily handled. In the preparation of the polymer of the present invention, the monomers are combined, usually in an appropriate polymerization reaction vessel, and the catalyst is added, dissolved in the monomers which are then mixed to distribute the catalyst uniformly, and polymerization reaction then proceeds. As noted above, the preferred catalysts are the free-radical per-compounds and particularly preferred is 2,5-dimethylhexane-2,5-diperoxy-2-ethyl hexoate, available from Witco Chemical Company under the trademark "USP-245". When this preferred catalyst species is employed, it will generally be present in amounts of from about 0.05 to 0.50, preferably about 0.2, weight percent of the total mix. When other catalysts or catalyst systems are employed, they are employed in proportions consistent with their known catalytic performance. Such proportions may range in some cases from as little as about 0.001 weight percent of the mix (or in exceptional cases, even less) to as much as 2.0 weight percent or even more. It is intended that such catalyst systems be employed in appropriate fashion well known to those of ordinary skill in the art and neither the selection of a particular catalyst or catalyst system, nor the appropriate proportions thereof, forms any part of the present invention.

As already mentioned, polymerization process parameters are not critical and will generally be chosen on the basis of convenience, availability of equipment, and consistency with the particular catalyst species chosen. With the preferred catalyst, 2,5-dimethylhexane-2,5-2-ethyl hexoate, such conditions many conveniently if desired include the provision of an inert atmosphere, such as nitrogen, at a somewhat elevated pressure, say about one atmosphere above ambient, and an elevated temperature, often on the order of about 50° to 75°C. The polymerization is generally carried to completion, over about 2 to 12 hours, for example.

Polymerization may be conducted in molds conformed to a basic lens blank shape, or in the form of rods or the like which are thereafter cut into lens blanks. Because of the ready and reliable machinability of the polymer there is no need to employ difficult and exacting techniques such as the centrifugal casting polymerization techniques often employed, although if desired these procedures too may be employed.

The polymer is in any eventuality formed by convenient techniques into lens blanks of appropriate dimensions, and then machined and polished to appropriate specifications into lens shapes, allowing for the expansion which takes place upon hydration of the polymer. Machining and polishing take place conveniently by the familiar techniques common to the manufacture of hard, i.e., polymethyl methacrylate, contact lenses.

The linear expansion of the polymer and lenses prepared in accordance with the present invention is extremely uniform and reproducible. The water content of the polymer and lenses formed therefrom at full hydration will range from about 25 to 50, generally about 35, weight percent, depending upon the specific monomer proportions employed. The linear degree of expansion from dry to fully hydrated will range from about 14 to 30, generally about 18 percent, based on dry dimensions.

The ease of machinability and polishing and the highly predictable and reproducible expansion characteristics of the polymer make possible the attainment of far closer tolerances and far greater compliance with a prescription than has heretofore been possible with hydrophilic gel polymer lenses, resulting in substantially better correction of visual defects and higher visual acuity for the user. These same characteristics for the first time make possible the realistic and practical attainment of complex shapes, expanding the visual problems amendable to correction with the hydrophilic gel polymer lenses.

Once the prescribed lens is formed, allowing for expansion, the lens polymer is hydrated before use. While water may be used, it is distinctly preferred to employ an aqueous saline solution, isotonic with the eye and buffered to an appropriate pH, most often in the range of about 6.8 to 7.4.

Full hydration may be attained in as little as about two hours, although it is ordinarily preferred to allow a larger period to ensure full hydration. If convenient, it is generally preferred to allow the lenses to soak say overnight or for a like period in a substantial excess of the hydrating medium. Once hydrated it is preferred that the lens be maintained in this condition, with periodic soaking in an appropriate hydrating and soaking medium. Since the usual practice is to require the user to remove the lenses overnight, this period affords a safe and effective period for maintenance of hydration.

The preparation of the polymer of the present invention is illustrated in the following specific examples, and also shown is the formation of the polymer into contact lenses according to the present invention. It is intended to show the best mode of practicing the invention comtemplated for the guidance of those of ordinary skill in the art, but not to limit or define the scope of the invention. Given the guidance of the present disclosure, those skilled in the art will understand that there are many variations which can be made in known fashion.

EXAMPLE I

A bulk polymerization mix is formed of the following:

| | | |
|---|---|---|
| hydroxyethyl methacrylate | 1,000 | milliliters |
| cyclohexyl methacrylate | 40 | milliliters |
| iso-butyl methacrylate | 50 | milliliters |
| N-(1,1-dimethyl-3-oxobutyl) | | |
| acrylamide | 50 | milliliters |
| trimethylolpropane trimethacrylate | 1.36 | milliliters |

The monomer mixture is stirred thoroughly to a homogenous solution and 2.0 grams of 2,5-dimethylhexane-2,5-diperoxy-2-ethyl hexoate is added with continued stirring for about 15–30 minutes.

The polymerization mix thus formed is poured into a plurality of molds of a shape approximating a len or lens blank. The molds are fitted with a cover which is evacuated to about 24 inches (water) and then pressurized with nitrogen gas to about one atmosphere above ambient pressure. The sealed molds are then heated to a temperature of about 65°C and held at below 80°C for about three to four hours.

The molds are then cooled, opened, and a plurality of lens blanks are obtained. Upon examination, the lens blanks are found to be tough and resilient and have a transparent, colorless appearance.

The blanks were then machined into contact lenses on a conventional hard lens lathe. The machined surfaces were examined under magnification and were found to be substantially free of pits, gouges, rough areas, and the like, having a substantially uniform appearance requiring little polishing. Measurement revealed close conformation to design tolerances and specifications, based on predicted 18% linear expansion upon hydration.

The lens were then polished to fine optical surfaces and were then hydrated by soaking for eight hours in isotonic saline. The hydrated lenses were remeasured and were found to conform to prescribed specifications within quite good tolerances.

The lenses were delivered to users for whom they had been prescribed and were worn over a period of six weeks in a normal fashion for gel lenses with no problems.

EXAMPLE II

The procedure of Example I was repeated with the following monomer mixtures:

| Sample: | A | B | C | D |
|---|---|---|---|---|
| hydroxyethyl methacrylate, wt. % | 85.86 | 89.86 | 89.86 | 85.86 |
| cyclohexyl methacrylate, wt. % | 4 | | | 4 |
| iso-butyl methacrylate, wt. % | 5 | 5 | | |
| N-(1,1-dimethyl-3-oxobutyl) acrylamide, wt. % | 5 | 5 | 10 | 10 |
| trimethylolpropane trimethacrylate, wt. % | 0.136 | 0.136 | 0.136 | 0.136 |
| linear expansion-fully hydrated, % | 18 | 21 | 21 | 18 |
| water content-fully hydrated, % | 35 | 42 | 42 | 35 |

Machining the polymer blanks proceeded in the same fashion as in Example I, with excellent results.

The polymer of the present invention may also include minor amounts, up to about 15 weight percent based on the 2-hydroxy-ethyl methacrylate, of other monomers, including for example, methyl methacrylate, t-butyl methacrylate, t-butyl acrylate, n-butyl n-butyl methacrylate n-butyl acrylate, lauryl methacrylate, lauryl acrylate, and the like. It will generally be preferred to reduce the proportion of the iso-butyl methacrylate when other such monomers are included by a corresponding amount, although such inclusions are not generally preferred practice.

What is claimed is:

1. A hydrophilic gel polymer consisting essentially of the addition copolymer of hydroxyethyl methacrylate, about 1 to 20 weight percent N(1,1-dimethyl-3-oxobutyl) acrylamide, up to about 10% iso-butyl methacrylate, up to about 5 weight percent cyclohexyl methacrylate and about 0.01 to 0.50 weight percent trimethylolpropane trimethacrylate.

2. The polymer of claim 1 wherein the N-(1,1-dimethyl-3-oxobutyl) acrylamide is included in an amount of about 10 weight percent.

3. The polymer of claim 1 wherein said copolymer includes about 5 weight percent iso-butyl methacrylate and about 5 weight percent N-(1,1-dimethyl-3-oxobutyl) acrylamide.

4. The polymer of claim 1 wherein said cyclohexyl methacrylate is present in about 4 weight percent.

5. The polymer of claim 1 wherein said trimethylolpropane trimethacrylate is about 0.136 weight percent.

6. A hydrophilic gel polymer contact lens comprising a hydrated gel of the polymer of claim 1 containing about 25 to 50 weight percent weight.

7. The lens of claim 6 wherein said hydrated gel contains about 35 weight percent water.

* * * * *